May 19, 1970     J. KUHTZ     3,512,655
SHIPS DERRICKS

Original Filed March 4, 1966     4 Sheets-Sheet 1

Inventor:
Jochen Kuhtz
By
Watson, Cole, Grindle & Watson
Atty.

United States Patent Office 3,512,655
Patented May 19, 1970

3,512,655
SHIPS DERRICKS
Jochen Kuhtz, Hamburg-Osdorf, Germany, assignor to Howaldtswerke-Deutsche Werft Aktiengesellschaft, Hamburg and Kiel, Germany
Continuation of application Ser. No. 531,904, Mar. 4, 1966. This application Mar. 5, 1968, Ser. No. 710,545
Int. Cl. B66c 23/52
U.S. Cl. 212—3
5 Claims

ABSTRACT OF THE DISCLOSURE

A derrick for ships to serve a pair of hatches arranged one in front of the other and having a pair of upright posts arranged on each side of the ship with the hatches between them and an upright boom with the lower end pivoted to the deck between the holds. There are two pulley tackle means connected to the top of the boom and bracket means, together with lifting pulley tackle means journaled to the bracket means.

---

This application is a continuation of pending application Ser. No. 531,904, filed Mar. 4, 1966, and now abandoned.

The present invention relates to ships derricks comprising a pair of posts with a pivoting derrick boom between them.

One particular object of the invention is to provide such an arrangement in which the boom can be swung from one hatch to another without disconnecting and re-connecting pulley tackle on it.

The invention consists in a ships derrick for serving a pair of hatches arranged one in front of the other, comprising a pair of upright posts arranged on each side of the ship with the hatches between them, an upright boom whose lower end is pivoted to the deck between the hatches, the posts being arranged respectively port and starboard of the boom, two luffing tackle means connecting, respectively, the top of the boom with the posts, bracket means on the boom top, pulleys of the luffing tackle means being journalled in the bracket means, and two load lifting pulley means having pulleys journalled in the bracket means; the lifting tackle means being arranged respectively to port and starboard of the boom.

The derrick preferably comprises a pin running in a port and starboard direction to the top of the boom and serving to connect the bracket means. The boom can be provided with swivel means enabling that part of the boom to which the pin passes to swivel about the boom axis in relation to the boom below the pin. The bracket means can include swivels enabling them to swivel in relation to the pin.

The posts preferably comprise heads mounted so as to be able to swivel about upright axes. The heads can be connected with pulleys of the respective luffing tackle means by rods. For guiding luffing and lifting ropes the heads of the posts are preferably provided with pulleys. The axes about which the heads of the posts swivel preferably converge in a downward direction and each head has a hole parallel to its swivel axis for the passage of the lifting and luffing ropes.

Preferably, also, the posts are inclined so that their top ends are nearer together than their bottom ends though the angle which each post makes with the vertical does not exceed 90 degrees.

The attached drawings show, by way of example only, one embodiment of the invention.

Figure 1:
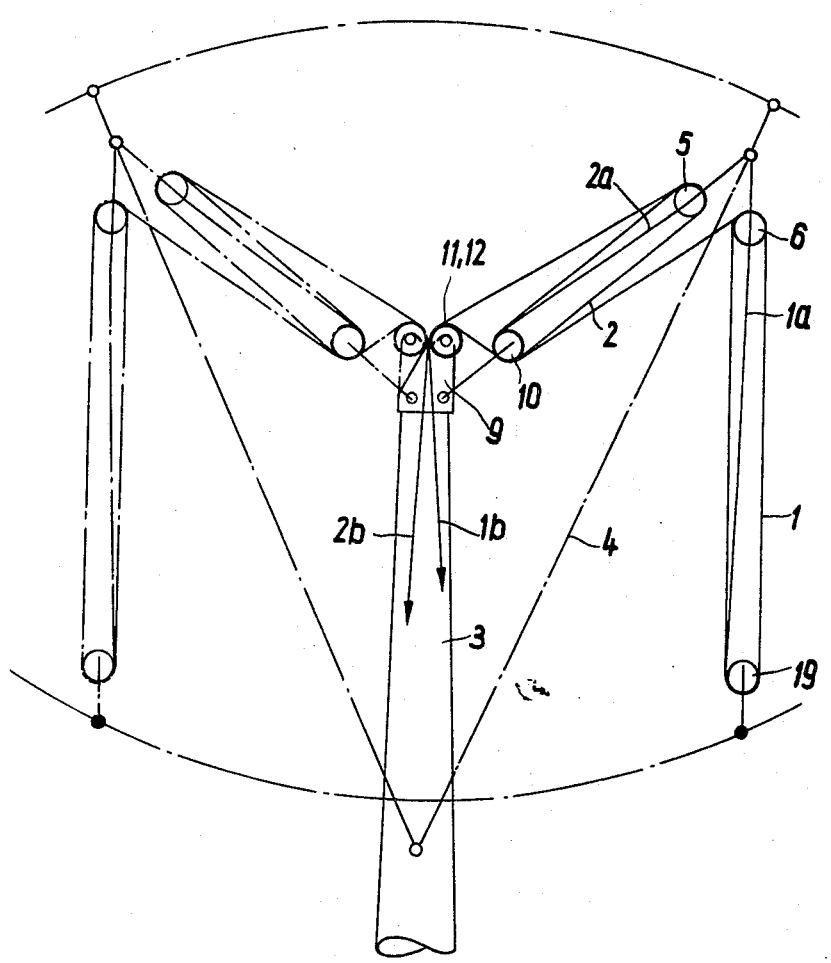
FIG. 1 is a diagrammatic view of the derrick embodying the invention, seen looking towards the side of the ship on which it is mounted.
Figure 2:
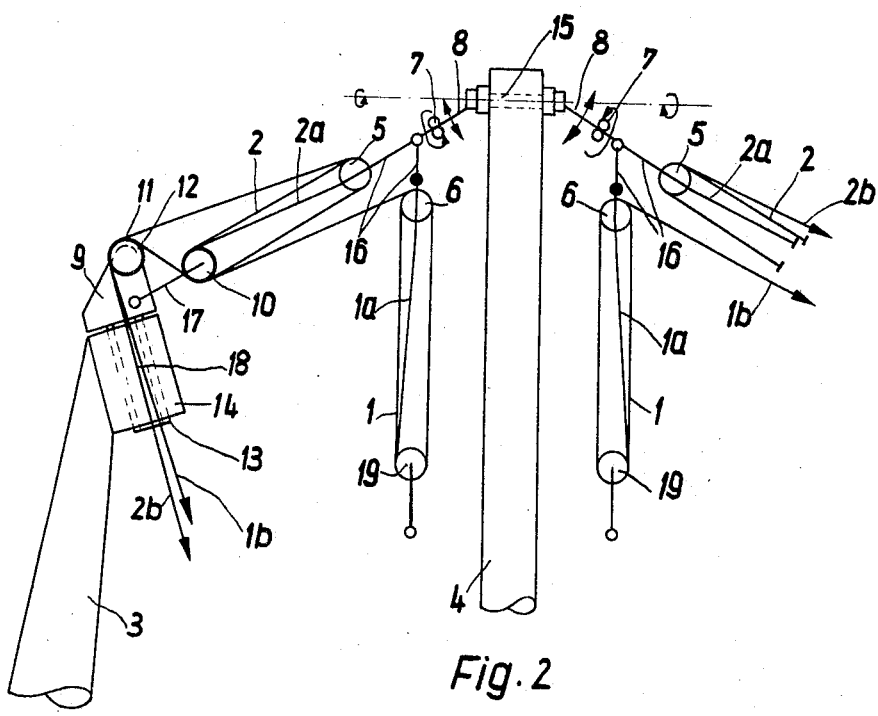
FIG. 2 is a diagrammatic view of part of the derrick looking along the axis of the ship.

The derrick includes two upright posts 3 whose bottom ends are fixed to the deck of the ship to the port and starboard of a pair of hatches. The hatches (not shown) lie respectively to the fore and aft of a transverse strip of deck on which the bottom end of a boom 4 is pivoted so that the boom may swing both in the port and starboard directions and also fore and aft. This allows the boom to be inclined over either of the two hatches for removing cargo from them and placing cargo in them. FIG. 1 shows one position of the boom over one hatch and another position of the boom over the other hatch.

The boom is luffed by means of two pulley tackle means 2 attached to the posts 3 in a manner later to be described. Each luffing tackle means includes two pulleys 5 and 10 and is controlled by means of a rope 2b passing up through the top of the respective post 3 around the pulley 5 then around the lower pulley 10 then, as denoted by reference numeral 2, round a further pulley co-axial with pulley 5 and down around a pulley co-axial with pulley 10, the rope then being continued by a part denoted by reference numeral 2a which is attached to a bracket 16 in which the pulley 5 and pulley co-axial to it are journalled. Each rope 2b passes up through the head 9 of a post 3 and over a pulley 11. The head 9 includes a pin 13 containing a cylindrical socket at the top of the stationary part of the post 3 so that the two heads can swivel about axes which converge in a downward direction. Each head 9 is of course provided with a central hole 18 for the passage of the rope 2b and the further rope 1b. Each of the pulleys 10 and the pulleys which are co-axial to them are carried on rods 17 pivoted to the heads 9 of the posts 3. In this manner each of the tackle means 2 is able to pivot in a vertical plane in relation to the head 9 of the post 3 while each head is able to pivot about an upright axis in relation to the bottom part of each post 3.

For lifting two loads lifting tackle means 1 are provided. Each of these tackle means has a top pulley 6 and a lower pulley 19 carrying a hook (not shown) for a load. Each of these pulleys has a further pulley co-axial with it so that the lifitng ropes 1b, which pass up the holes 18 in the heads 9 and over pulleys 12 co-axial with pulleys 11 can pass over the pulleys 6 down to the pulleys 19, back up around the pulleys co-axial with the pulleys 6, down again round pulleys co-axial with the pulleys 19 and then up to the brackets 16 to which they are fixed. The fixed ends of the ropes are indicated by 1a. The brackets 16 include parts 8 connected with a horizontal pin 15 passing through a hole in the top of the boom 4. This pin 15 is able to swing about its own axis and moreover the top part of the boom through which it passes is able to swing about the axis of the boom in relation to the lower part of the boom. The parts 16 and 8 of each of the brackets are connected together by swivels 7 enabling the bracket parts 16 to swivel about the axes of the parts 8.

In operation the position of the boom 4 is controlled by windlasses attached to ropes 2b. Loads can be lifted with the two lifting tackles 1 working separately or alternatively, their bottom ends can be connected by a crosspiece so that they can be used for lifting a single load together.

One of the advantages of the derrick is that the boom can be swung over from one of the hatches to the other without having to disconnect any of the tackle means from the boom and re-connect it. If a crosspiece is used between the lower ends of the lifting tackle means 1, it must be removed, naturally, before the boom is swung over from one hatch to the other.

A further advantage is that owing to the arrangement of the pulleys on pivoting means such as the rods 17, the appearance of uncontrollable forces is prevented so that with a suitable control of the windlasses it is possible to lift very long loads without the use of a crosspiece.

Figure 3:
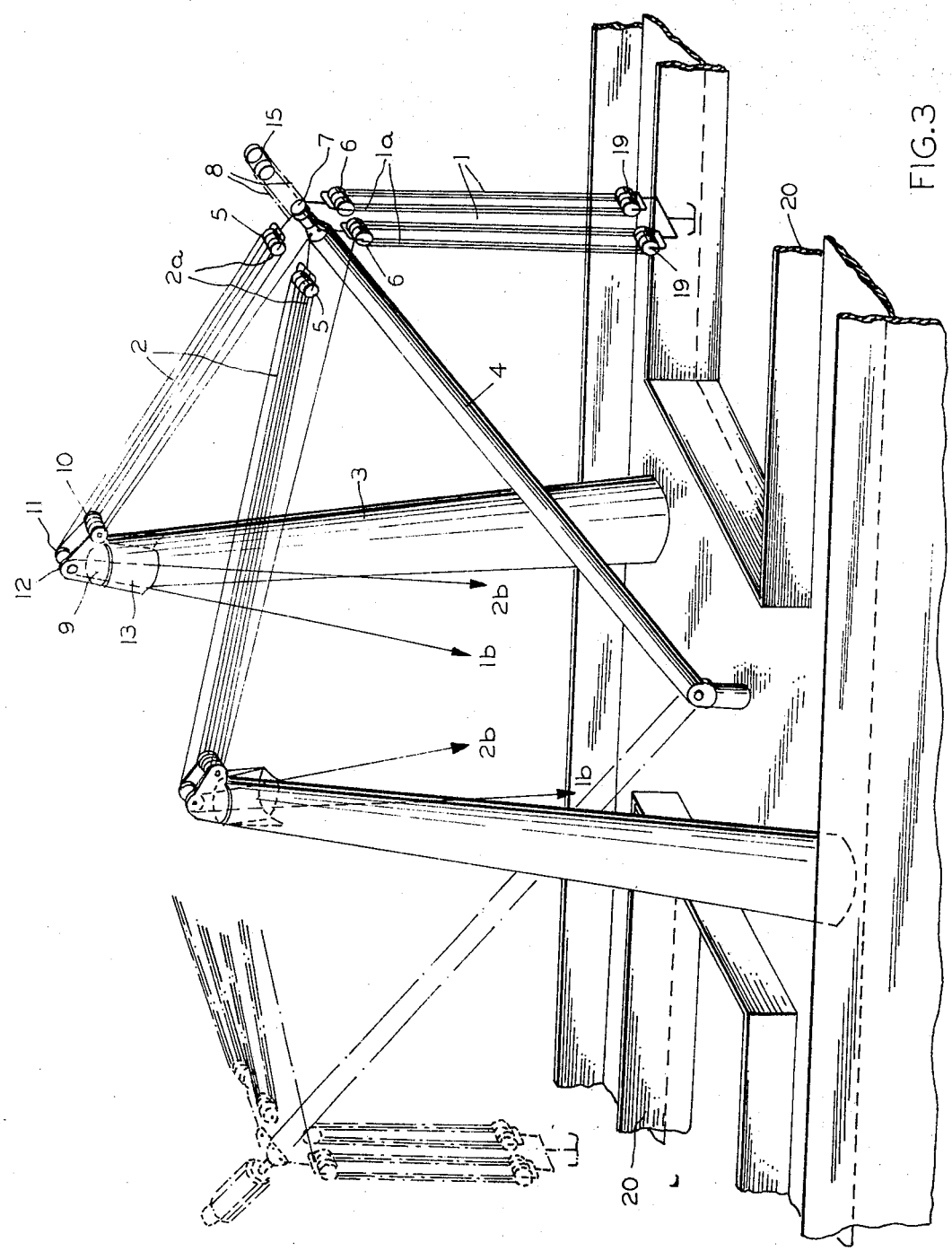
FIG. 3 is a diagrammatic view of a modified derrick with the hatches.
Figure 4:
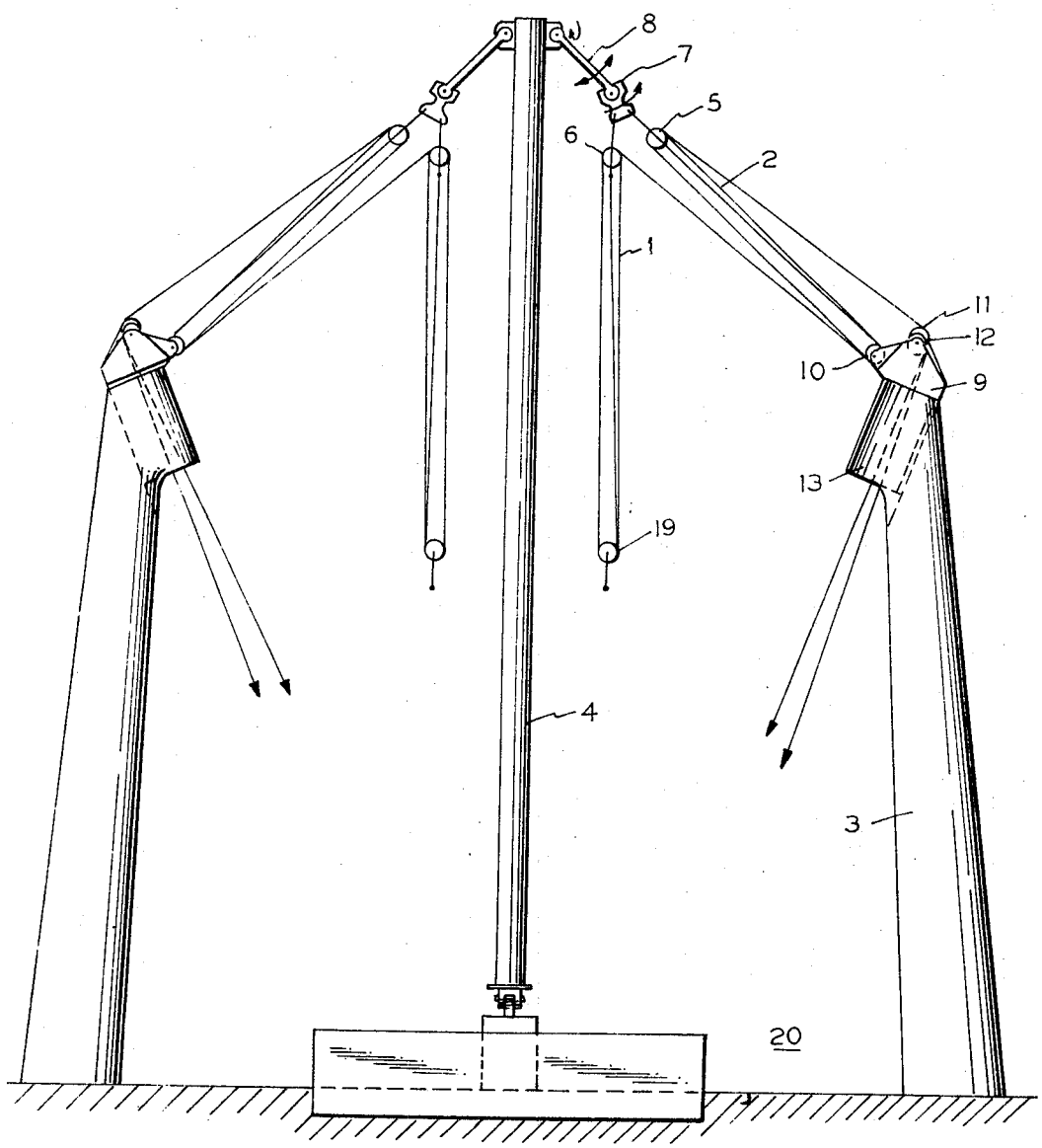
FIG. 4 is a front elevation of the derrick of FIG. 3.

FIGS. 3 and 4 illustrate the posts 3 relative to the hatches 20. The drawing of these figures shows the relationship between the booms and the hatches as shown in FIG. 3 and also the construction of the top of the booms together with the posts and the various interconnecting rope and pulley elements. FIG. 3, shows the two posts 3 and the boom 4 between them. FIG. 4 also shows the two hatches 20 in which the derrick structure is shown in full lines cooperation with the left hatch. FIG. 4 also shows the middle boom 4 and the two posts 3 in a view taken at right angles to the longitudinal axis of the ship.

Referring to FIG. 3, there are two posts 3 with a middle boom 4, with all three mounted on a deck of a ship between the pair of hatches 20. A plurality of cables or ropes 2 passing around pulleys 5 and 10 are mounted on the tops of the posts 3 and the boom 4. At 10 the pulleys are secured on the cap members 13 at the top 9, and 11 and 12 are side plates on the cap member 13. The pulleys 5 have the cables connected at 2a and the cables 2 are controlled by the end cables 1b and 2b.

FIG. 4 shows a central or middle boom connected at the top by links 8 and socket 7 to the pulleys 5 and 6 and cables 2 to the posts 3.

I claim:
1. A ships derrick for serving a pair of hatches arranged one in front of the other, comprising;
   a pair of upright posts arranged on each side of the ship with the hatches between them;
   an upright boom whose lower end is pivoted to the deck between the hatches, the posts being arranged respectively port and starboard of the boom;
   two luffing pulley tackle means connected, respectively, to the top of the boom with the posts;
   bracket means on the boom top in which the pulleys of the luffing tackle means are journalled;
   a pin running in a port-starboard direction relative to the ship through the top of the boom and serving to connect the bracket means, swivel means connecting said bracket means to said pin, said swivel means enabling that part of the boom through which the pin passes to swivel about the boom axis in relation to the part of the boom below it;
   and two independently operated load lifting pulley tackle means having pulleys journalled in the bracket means, the two lifting tackle means being arranged respectively to the port and starboard of the boom, said two lifting tackle means each having one fixed and one hauling part.

2. A derrick as set forth in claim 1 in which the bracket means comprise swivels by which they are connected to the pin.

3. A derrick as set forth in claim 1 comprising heads which are journalled on the top part of the posts so as to swivel about upright axes, rods on the heads connected with pulleys of the respective luffing tackle means, and pulleys on the heads for guiding ropes of the luffing tackle means and the lifting tackle means.

4. A derrick as set forth in claim 3 in which the swivel axes of the heads make angles with the posts and converge in a downward direction, each head having a hole parallel to the swivel axis for the passage of the ropes connected with the lifting and luffing tackle means.

5. A derrick as set forth in claim 1 in which the posts are inclined so that their top ends are nearer together than their bottom ends, the angle of inclination of each post to the vertical not exceeding 90 degrees.

References Cited

UNITED STATES PATENTS 3,236,390   2/1966   Sprengel.

HARVEY C. HORNSBY, Primary Examiner